June 3, 1969     W. A. GEYGER     3,448,376

FUNDAMENTAL FREQUENCY RING CORE FLUX GATE MAGNETOMETER

Filed Jan. 17, 1964     Sheet 1 of 2

INVENTOR.
William A. Geyger

BY

ATTORNEY.

INVENTOR.
William A. Geyger

United States Patent Office 3,448,376
Patented June 3, 1969

3,448,376
FUNDAMENTAL FREQUENCY RING CORE FLUX GATE MAGNETOMETER
William A. Geyger, Takoma Park, Md., assignor to the United States of America as represented by the Secretary of the Navy
Filed Jan. 17, 1964, Ser. No. 338,536
Int. Cl. G01r 33/02
U.S. Cl. 324—47
3 Claims

ABSTRACT OF THE DISCLOSURE

A ring core flux gate magnetometer of the fundamental frequency type in which a rectified half wave voltage is used to energize a toroidal core. An output voltage of the fundamental frequency is obtained from a detector circuit when the magnetometer is energized and placed in a magnetic field. In a modified arrangement, two ring core flux gate elements are combined and may be utilized either as a very sensitive magnetometer or as a gradiometer.

---

Figure 2:
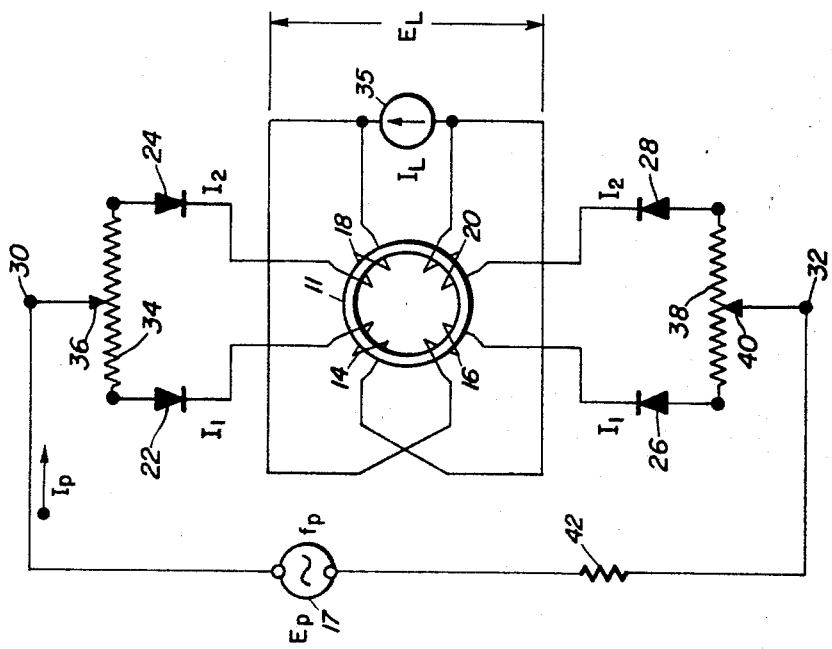

The invention described herein may be manufactured and used by or for the Government of the United States of America for governmental purposes without the payment of any royalties therein or therefor.

This invention relates to magnetometers and more particularly to the fundamental frequency class of magnetometers.

In my copending application Ser. No. 143,998, filed Oct. 9, 1961, now Patent No. 3,211,610, a second harmonic type magnetometer is disclosed in which a ring core element having no air gap is employed. The ring core or toroidal core provided a unique sensing element for the second harmonic type magnetometer. It was discovered that placing such a ring core element in a magnetic field to be measured and energized the core with an AC flux, that the core divided electromagnetically into two semicircular portions. This discovery made possible the substitution of the two parallel cores normally used in magnetometers with a single toroidal core. The use of the single toroidal core reduced substantially the power required for energizing the magnetometer and eliminated the core matching problem.

In this invention the ring core magnetometer is utilized in the self-saturating or fundamental frequency type magnetometer. In the fundamental frequency type magnetometer of this invention a single toroidal saturable core is provided with windings which are connected to a source of AC voltage through rectifiers. Rectified half-wave voltage is applied to the windings to energize the core and then the core is placed in a magnetic field to be measured. The magnitude of the load current is an indication of the strength of the magnetic field measured. Since the fundamental frequency type magnetometer will operate in saturation, larger magnetic fields may be measured than wtih the second harmonic type magnetometer.

It is an object of this invention to provide a self-saturating ring core magnetometer of the fundamental frequency type.

It is another object of this invention to employ a single toroidal core as a sensing element in a magnetometer of the fundamental frequency type.

It is a further object of this invention to provide a ring core magnetometer that will operate in saturation.

It is a still further object of this invention to provide a ring core magnetometer of the fundamental frequency type energized by a DC pulsed voltage.

Figure 1:
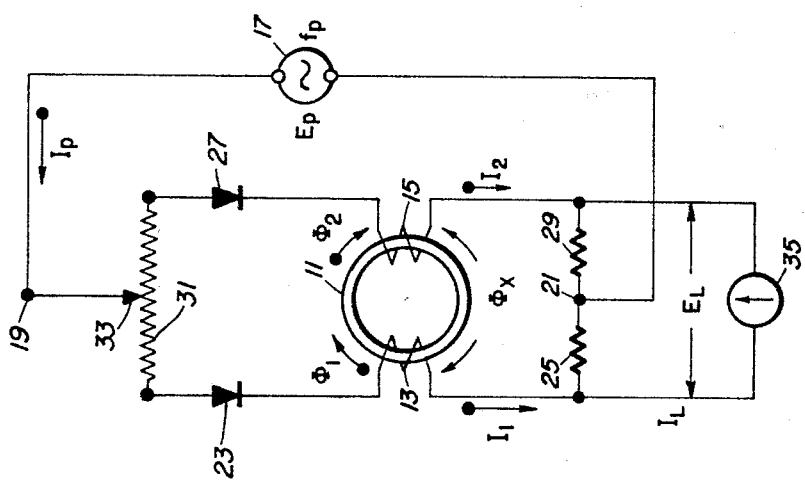
Figure 4:
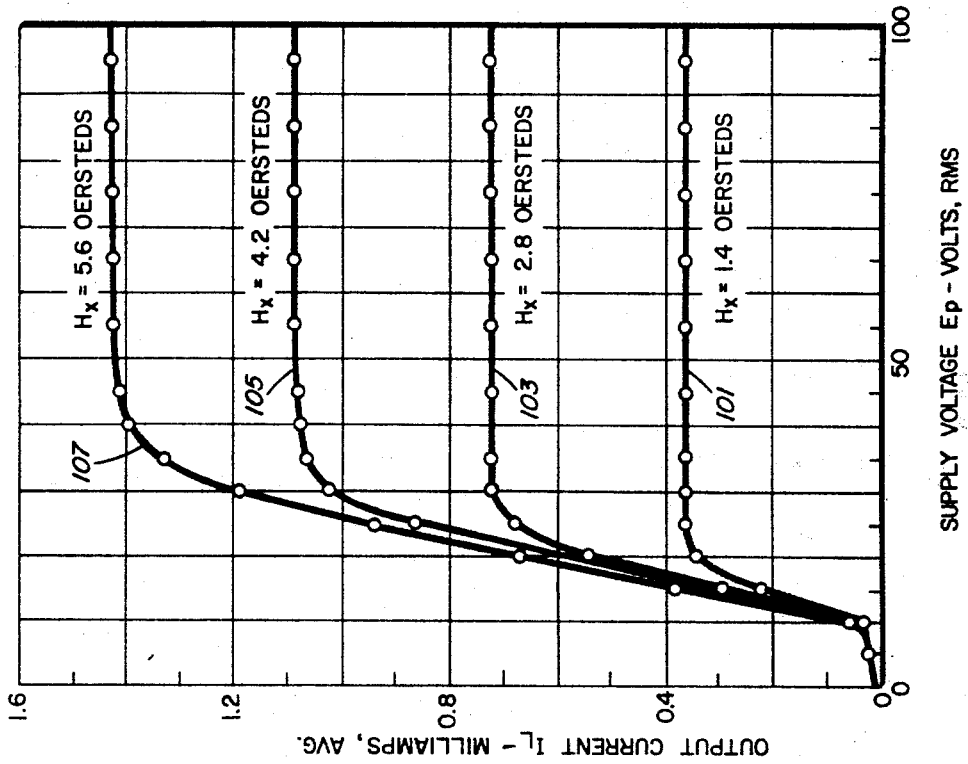
Figure 3:
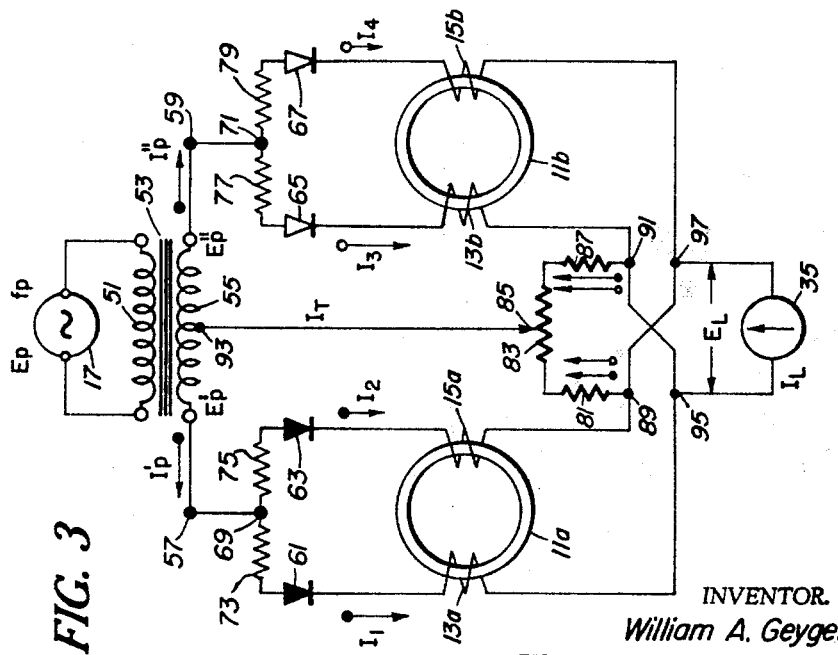

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 1 of the drawings illustrates an embodiment of the fundamental frequency ring core magnetometer of this invention;

FIG. 2 of the drawings illustrates an embodiment of the fundamental frequency ring core magnetometer of this invention in which four energizing windings are employed;

FIG. 3 of the drawings illustrates a full-wave two-core magnetometer of the fundamental frequency type; and FIG. 4 of the drawings illustrates the relationship between input voltage and load current for magnetic field strengths.

Referring now to FIG. 1 of the drawings in which a fundamental frequency magnetometer is illustrated, a toroidal or ring-shaped core 11 is shown having windings 13 and 15. An AC voltage source 17, having a voltage $E_p$ a current flow $I_p$, and a frequency $f_p$, is connected to terminals 19 and 21. Winding 13 is connected to terminals 19 and 21 through diode 23 and resistor 25. Winding 15 is connected to terminals 19 and 21 through diode 27 and resistor 29. Windings 13 and 15 are thus each connected to a source of half-wave rectified voltage. That is, winding 13 is connected to source 17 through diode 23 which provides a half-wave rectified voltage for energizing winding 13 and winding 15 is connected to AC voltage source 17 through diode 27 which provides a half-wave rectified voltage for energizing winding 15.

A resistor 31 is connected across diodes 27 and 23 with a center tap 33 which is connected to terminal 19. A meter 35 such as a center-zero scale d'Arsonval type micrometer, for example, is connected across resistors 25 and 29.

In operation, ring core 11 is energized by half-wave pulses of energy and placed in a magnetic field to be measured. When the magnetometer core is then placed in a magnetic field to be measured, the core will be divided electromagnetically into two semicircular core portions. The core will now act as two separate, equally rated, cores except that the magnetizing energy required will be greatly reduced since there are no air gaps between the two core portions as in the conventional two-core magnetometer arrangement. The total current flow in the energizing circuit $I_p$ is divided into current flow $I_1$ in the branch of the circuit including winding 13 and current flow $I_2$ in the branch of the circuit including winding 15. The relative magnitudes of $I_1$ and $I_2$ are determined by the magnitude and direction of the flux $\Phi_x$ of the magnetic field to be measured. For example, if the flux $\Phi_x$ of the field to be measured has the magnitude and direction as indicated by the arrows, it will add to the flux $\Phi_1$ produced by the current flow $I_1$, as they both tend to produce fluxes in the same direction. The flux $\Phi_x$ is opposite in direction of the flux $\Phi_2$ produced by current $I_2$, however, and the flux $\Phi_x$ is subtracted from flux $\Phi_2$. The increased flux density in the core area in the vicinity of winding 13 will tend to decrease the effective resistance value of winding 13 and hence tend to increase the current $I_1$ flowing through winding 13. On the other hand, the decrease in flux in the area of the core near winding 15 will tend to increase the resistance of winding 15 to cause current $I_2$ to decrease in value. The current balance adjustment for the circuit may be made by moving the tap 33 of resistor 31 such that the current flow in the load circuit $I_L=0$ when the flux $\Phi_x=0$. The current flow $I_L$ as indicated by meter 35 will be proportional to the strength of the magnetic field to be measured.

Referring now to FIG. 2 of the drawings in which another embodiment of the ring core magnetometer is illustrated, core 11 is provided with windings 14, 16, 18 and 20. An AC voltage source 17 is connected through diodes 22, 24, 26 and 28 to windings 14, 16, 18 and 20 at junctures 30 and 32. A meter 35 is connected to the load or output circuit of windings 14, 16, 18 and 20. A first balancing resistor 34 having movable tap 36 is connected across diodes 22 and 24. A second balancing resistor 38 having movable tap 40 is connected across diodes 26 and 28.

With the arrangement of FIG. 2 the mixing resistors have been eliminated in order to increase the sensitivity of the magnetometer. A separate current limiting resistor 42 is provided to prevent the total current $I_p$ from reaching an excessively high value.

The load voltage, $E_L$, across meter 35 and the current flow $I_L$, through meter 35 will be determined by the difference in the currents $I_1$ and $I_2$. That is $I_L$ is approximately equal to $I_1-I_2$.

Referring now to FIG. 3 of the drawings, a full wave ring core magnetometer of the fundamental frequency type is illustrated in which two ring core elements are employed. Core 11a is supplied with windings 13a and 15a and core 11b is supplied with windings 13b and 15b. An AC voltage source 17 is connected to the primary winding 51 of transformer 53. One terminal of secondary winding 55 is connected to juncture 57 between diodes 61 and 63, and the other terminal of secondary winding 55 is connected to juncture 59 between diodes 65 and 67. Juncture 69 between resistors 73 and 75 connects to juncture 57, and juncture 71 between resistors 77 and 79 connects to juncture 59. A return path for current flow is provided by resistors 81, 83 and 87 which are serially interconnected to junctures 89 and 91. Movable tap 85 of resistor 83 connects to the center tap 93 of secondary winding 55. A voltage $E_p'$ is rectified by diodes 61 and 63 and applied to windings 13a and 15a. Current $I_p'$ flows into juncture 57 where it divides into a furrent $I_1$ which flows through winding 13a and a current $I_2$ which flows into juncture 57 where it divides into a current $I_1$ applied to windings 13b and 15b. Current $I_p''$ flows into juncture 59. Current $I_p''$ is divided into current $I_3$ which flows through winding 13b and current $I_4$ which flows through winding 15b.

When the ring core elements of the magnetometer are placed in a magnetic field to be measured and energized by AC voltage source 17, during a positive half-cycle, for example, current $I_1$ will flow through diode 61 and winding 13a, and current $I_2$ will flow through diode 63 and winding 15a. It is noted that the black diodes and the black dots at the end of the current arrows indicate current flowing through a particular portion of the circuit for a given half cycle, positive half-cycles, for example and white diodes and the white dots at the end of current arrows indicate current flow in a particular portion of the circuit during alternate half-cycles, such as negative half-cycles, for example. Current $I_1$ further flows through resistor 87, a portion of resistor 83 and through movable tap 85 to the center tap 93 of transformer 53. Current $I_2$ further flows through resistor 81, a portion of resistor 83 and through movable tap 85 to center tap 93 of transformer 53. During a negative half-cycle, for example, current $I_3$ will flow through diode 65 and winding 13b, and current $I_4$ will flow through diode 67 and winding 15b. The return path for current $I_3$ is through resistor 87, a portion of resistor 83 and through movable tap 85 to center tap 93 of transformer 53. The return path for current $I_4$ is through resistor 81, a portion of resistor 83 and through movable tap 85 to center tap 93 of transformer 53. A current $I_T$ flows through the conductor connecting movable tap 85 to center tap 93.

The difference current $I_2-I_1$ will flow through the meter or load 35 connected between terminals 95 and 97 in addition to the difference current $I_3-I_4$. In other words the load current $I_L$ will be approximately $$(I_1-I_2)+(I_3-I_4)$$

Referring now to FIG. 4 of the drawings in which a graphical representation of the relationships between supply voltage $E_p$ and the output current $I_L$ are shown at various discrete field strengths, curve 101 indicates this relationship for a field strengh $H_x$ of a field to be meausred of 1.4 oersteds. The output current is virtually constant with the supply voltage changing from about 25 volts to 100 volts RMS. Curve 103 indicates that the output current for a field of $H_x$ of 2.8 oersteds is virtually constant within a range of supply voltage variations from about 30 volts to 100 volts RMS. Curve 105 indicates that for a field strength $H_x$ of 4.2 oersteds, that the output current $I_L$ remains virtually constant over a range of variation of input voltages changes from about 35 volts to 100 volts RMS. Curve 107 indicates that for a field strength $H_x$ of 5.6 oersteds, that the output current remains virtually constant over a range of input voltage changes from about 45 volts to 100 volts RMS.

The two magnetometer element circuits of FIG. 3 may be rearranged for use as a gradiometer. This may be done, for example, by physically rotating one of the cores 180° with respect to the other. For example, if core element 11b were turned 180°, the output or load current $I_L$ would be approximately $(I_1-I_2)-(I_3-I_4)$. This difference current would represent the difference in ambient magnetic field strength of the two core locations.

The circuit of FIG. 3 may be combined either as a magnetometer or as a gradiometer with a self-balancing magnetic amplifier to produce a self-balancing magnetometer or gradiometer. The combination of one of the magnetometers or gradiometers with the self-balancing magnetic amplifier having infinite internal gain makes it possible to balance the unidirectional flux components produced by the external magnetic field by an opposing unidirectional flux which is linearly proportional to the average value of the polarity reversible output current of the magnetic amplifier. In this case, with critical regeneration, the self-balancing flux-gate magnetometer or gradiometer is operated in such a way that the duo directional output current of the magnetic amplifier is varied by an infinitesimal AC flux increment in the ring core flux gate elements of the circuit of FIG. 3. Actually, the unidirectional flux in the cores of these elements is reduced to about $\frac{1}{1000}$ of its original value. Thus the magnetic field to be investigated, e.g., the earth's field in the vicinity of the ring core elements, remains substantially undisturbed. Another advantage is that the accuracy of measurements with self-balancing flux gate magnetometers is substantially independent of changes in the characteristics of circuit components, including the ring core flux gate elements. Furthermore, the operation will be substantially unaffected by large changes in magnitude and the frequency of the AC power supply, and by considerable changes in gate winding resistance and load resistance.

In order to obtain high sensitivity in the ring core elements of this type of flux detector, e.g., 1,000 microamperes per oersted, or 1 volt per oersted, it is necessary to obtain a sufficiently high effective permeability, which is a function of the inside diameter to outside diameter ratio (ID/OD) and the mean diameter of the core as well as the permeability of the magnetic material itself. Actually, the values of ID/OD ratio range from about 0.85 to 0.98; the mean diameter ranging from about 0.5 inch to 1.5 inches. Either tape wound or laminated washer type high permeability cores may be used for this purpose.

The application of toroidal cores in field sensitive constructions makes it possible to use relatively high excitation frequencies e.g., 10,000 cycles per second, by taking advantage of the favorable magnetic properties of ¼ mil or ⅛ mil nickel-iron alloy tapes, which have considerably reduced eddy current losses and skin effect losses. It is not practical to use such thin materials in the two parallel core structures of conventional magnetometers.

Obviously many modifications and variations are possible in the light of the above teachings. It is therefore to be understood that within the scope of the appended claims the invention may be practiced otherwise than as specifically described.

What is claimed as new and desired to be secured by Letters Patent of the United States is:

1. A fundamental frequency type ring core magnetometer comprising:
   a first toroidal saturable core,
   a second toroidal saturable core,
   a first winding wound on said first core,
   a second winding wound on said first core,
   a third winding wound on said second core,
   a fourth winding wound on said second core,
   a first rectifier means,
   a second rectifier means,
   a third rectifier means,
   a fourth rectifier means,
   a transformer having a primary winding and a secondary winding said secondary winding having a first terminal, a center tap and a second terminal,
   a first resistor,
   a second resistor having a moveable tap,
   a third resistor,
   means serially connecting said first, second, and third resistors,
   a load circuit including a meter connected to a third terminal and to a fourth terminal,
   means connecting said third terminal to said third resistor,
   means connecting said fourth terminal to seaid first resistor,
   means connecting said moveable tap of said second resistor to said center tap of said secondary winding,
   means serially connecting said first rectifier and said first winding to said first terminal of said secondary winding and to said third terminal of said load circuit,
   means serially connecting said second rectifier and said second winding to said first terminal of said secondary winding and said fourth terminal of said load circuit,
   means serially connecting said third rectifier and said third winding to said second terminal of said secondary winding and to said fourth terminal of said load circuit,
   means connecting said fourth rectifier and said fourth winding to said second terminal of said secondary winding and to said fourth terminal of said load circuit.

2. A fundamental frequency type ring core gradiometer comprising:
   a first toroidal saturable core,
   a second toroidal saturable core,
   a first winding wound on said first core,
   a second winding wound on said first core,
   a third winding wound on said second core,
   a fourth winding wound on said second core,
   a first rectifier means,
   a second rectifier means,
   a third rectifier means,
   a fourth rectifier means,
   a transformer having a primary winding and a secondary winding, said secondary winding having a first terminal, a center tap, and a second terminal,
   a first resistor,
   a second resistor having a moveable tap,
   a third resistor,
   means serially connecting said first, second, and third resistors,
   a load circuit including a meter connected to a third terminal and to a fourth terminal,
   means connecting said third terminal to said third resistor,
   means connecting said fourth terminal to said first resistor,
   means connecting said moveable tap of said second resistor to said center tap of secondary winding,
   means serially connecting said first rectifier and said first winding to said first terminal of said secondary winding and to said third terminal of said load circuit,
   means serially connecting said second rectifier and said second winding to said first terminal of said secondary winding and said fourth terminal of said load circuit,
   means serially connecting said third rectifier and said third winding to said second terminal of said secondary winding and to said fourth terminal of said load circuit,
   means connecting said fourth rectifier and said fourth winding to said second terminal of said secondary winding and to said third terminal of said load circuit.

3. A fundamental frequency self-saturating gradiometer comprising:
   a first ring core magnetometer having a first output circuit,
   a second ring core magnetometer having a second output circuit,
   means for energizing said first magnetometer with a pulsing DC voltage derived from the positive half-cycle of an AC source,
   means for energizing said second magnetometer with a pulsing DC voltage derived from the negative half-cycle of an AC source,
   a load circuit including a meter, and means for determining the difference in the field strength in the area of the two magnetometers by connecting the first output circuit and the second output circuit differentially to said load circuit.

References Cited

UNITED STATES PATENTS

| 2,390,051 | 12/1945 | Barth | 324—43 |
| 2,743,415 | 4/1956 | Williams et al. | 324—43 |
| 2,974,277 | 3/1961 | Wales | 324—43 |

FOREIGN PATENTS 844,051  8/1960  Great Britain.

OTHER REFERENCES

Geyger, W. A.—Flux Gate Magnetometer Uses Toroidal Core, *Electronics*, June 1, 1962, pp. 48–52.

RUDOLPH V. ROLINEC, *Primary Examiner.*

R. J. CORCORAN, *Assistant Examiner.*